United States Patent

[11] 3,616,456

| [72] | Inventor | Erkki Valmet |
| | | Solna, Sweden |
| [21] | Appl. No. | 823,374 |
| [22] | Filed | May 9, 1969 |
| [45] | Patented | Oct. 26, 1971 |
| [73] | Assignee | LKB-Produkter AB |
| | | Mariehall, Sweden |
| [32] | Priority | May 10, 1968 |
| [33] | | Sweden |
| [31] | | 6382/68 |

[54] DEVICE FOR ISOELECTRIC SEPARATION OF AMPHOLYTES
17 Claims, 11 Drawing Figs.

[52] U.S. Cl............................................ 204/299,
204/180 R, 204/180 G
[51] Int. Cl........................................... B01k 5/00
[50] Field of Search.................................... 204/180 R,
180 G, 180 P, 301, 299, 274, 275

[56] References Cited
UNITED STATES PATENTS

| 3,240,692 | 3/1966 | Donnelly..................... | 204/180 |
| 3,320,148 | 5/1967 | Skeggs......................... | 204/180 |
| 3,451,911 | 6/1969 | Tannenberger et al....... | 204/180 |
| 3,502,556 | 3/1970 | Chandler..................... | 204/301 X |
| 3,523,879 | 8/1970 | Cortes......................... | 204/301 X |

Primary Examiner—John H. Mack
Assistant Examiner—A. C. Prescott
Attorney—Waters, Roditi, Schwartz & Nissen ABSTRACT: A trough-shaped receptacle with two electrodes inserted therein; the bottom of the receptacle being shaped with projections that divide the receptacle into a plurality of compartments with each compartment having a cooling means in contact with the projection therein.

DEVICE FOR ISOELECTRIC SEPARATION OF AMPHOLYTES

The present invention relates to a device for isoelectric separation of ampholytes. Isoelectric separation is a method for separating ampholytes which has been known theoretically for a great while and also used in practice. This separation method is of a particular interest, as proteins are ampholytes to a large extent. The method is based on the mechanism that if through a solution containing several different ampholytes a direct current is produced between two spaced electrodes inserted in the solution and connected to the poles of a direct voltage source, the most acid ampholyte will concentrate at the anode and the most basic ampholyte at the cathode and the remaining ampholytes in the solution at different points therebetween in a sequence determined by their isoelectric points, pI. At the same time a pH gradient is created between the electrodes with the lowest pH value at the anode and the highest pH value at the cathode. This pH gradient is stable and it can be shown that the pH value at the point at which a certain ampholyte has its largest concentration corresponds to the pI of said ampholyte. If in addition to ampholytes the solution contains also a salt this will be dissociated and the corresponding base will concentrate at the cathode and the corresponding acid at the anode with the different ampholytes being concentrated in the space therebetween in a sequence determined by their pI. Consequently, each ampholyte is subject to an electrophoretic migration towards the point between the electrodes corresponding to the pI of the ampholyte. However, this migration is counteracted by a diffusion in both directions away from said point. Due to this two low-molecular ampholytes with adjacent isoelectric points can never be separated completely from each other unless the solution contains also an additional ampholyte having an intermediate isoelectric point. The diffusion is large for low-molecular ampholytes and small for high-molecular ampholytes, wherefore the latter give sharper concentration maxima at the isoelectric separation. It follows also that an ampholyte mixture containing a large number of low-molecular ampholytes with different but closely spaced isoelectric points can produce a very stable and linear pH gradient with a predetermined range between the two electrodes, provided the different ampholytes in the mixture are chosen properly with respect to their isoelectric points and their mutual proportions in the mixture. In such a stable pH gradient produced by a known mixture of low-molecular ampholytes, a so-called carrier ampholyte mixture, it is theoretically possible to obtain a very good separation of the constituents in an unknown mixture or sample of more high-molecular ampholytes. Due to their low rate of diffusion as compared with the rate of diffusion of the carrier ampholytes the high-molecular ampholytes will concentrate very strongly at the points in the pH gradient established by the carrier ampholyte mixture corresponding to the isoelectric points of the high-molecular ampholytes, whereby the different high-molecular ampholytes can be separated completely from each other. It should, therefore, be possible to use this separation method successfully for the separation of proteins. As carrier ampholytes for instance amino acids and polypeptides may be used. For this particular purpose special carrier ampholyte mixtures with very excellent properties have also been manufactured consisting of aliphatic polyamino-polycarbon acids.

When carrying out an isoelectric separation, however, the practical difficulties involved are considerable. A simple device of the type outlined in the foregoing can only be used for a very coarse and unsatisfactory separation, primarily due to the thermal convection caused by the heating of the solution by the electric current passing the solution. This convection is much stronger than the electrophoretic migration and must therefore be prevented if a satisfactory separation is to be obtained. One has tried to solve this problem by dividing the separation cell into a number of chambers separated by semipermeable walls disposed perpendicular to the current path between the two electrodes. Certainly, these semipermeable membrane walls reduce the thermal convection between the different chambers but cause instead an electro-osmotic flow between the chambers causing an intermixing of the different fractions. Further, in a separation device of this type the ampholytes and in particular high-molecular ampholytes have a tendency to sink to the bottom of the separation vessel, whereby they will be removed from the isoelectric separation. In order to prevent this it will be necessary to produce a circulation or stirring in each chamber, which complicates the separation device and again increases the risk of intermixing of the different fractions. An additional difficulty lies therein that a large fraction of high-molecular ampholyte concentrated in a certain chamber has a pronounced tendency to "fall out" under the effect of the gravity force through the adjacent semipermeable walls into the adjacent chambers having lower concentrations of high-molecular ampholytes and thus lower densities. One more problem is that when the separation is stopped by disconnection of the voltage source from the two electrodes, the electrophoretic migration of the ampholytes is instantly interrupted, whereas the diffusion on the other hand goes on. Consequently, it is necessary to remove the separated fractions of the different ampholytes as fast as possible from the separation cell before they are dispersed and remixed due to the diffusion. For these reasons it has not yet been possible to produce any satisfactory isoelectric separation with apparatuses of this type.

Very excellent results in isoelectric separation of proteins have been obtained, however, with a particular apparatus developed during the last years. This apparatus consists of a vertical separation column with the two electrodes disposed at the upper and the lower end thereof respectively. In this column a stable natural pH gradient is established by means of a suitable mixture of carrier ampholytes and in addition thereto a density gradient with decreasing density towards the upper electrode is established by means of a sugar solution. Thus, this column does not comprise any solid bodies which can cause electro-osmosis, but the density gradient established by the sugar solution stabilizes the column effectively against the thermal convection. In this column it is therefore possible to obtain a very strong concentration or focusing of high-molecular ampholytes, as for instance proteins, at the levels in the column where the pH values in the pH gradient established by the carrier ampholyte mixture correspond to the isoelectric points of the high-molecular ampholytes. However, also this separation column has certain serious disadvantages. Thus only comparatively small fractions of high-molecular ampholytes can be kept suspended in a stable state in the column. If the fractions become too large, they start to sink or "turn over" under the influence of the gravity force. The column can consequently be used only for small samples. Further the separated fractions will be contaminated with not only the carrier ampholytes but also with the sugar solution used for establishing the density gradient. It is also appreciated that it is a comparatively complicated and time-consuming work to produce the required density gradient in the separation column and that this process must be repeated for each separation. It also remains the problem that as soon as the voltage source is disconnected from the electrodes, the electrophoretic migration and thus the "focusing" of the different ampholyte fractions will be interrupted, whereas the diffusion goes on and tends to redisperse the focused fractions. Consequently, the column must be emptied as rapidly as possible, but on the other hand a too large rate of flow increases the risk of spreading and remixing of the fractions.

The object of the present invention is therefore to provide an improved device for isoelectric separation of ampholytes, in which the separation can be carried out without the use of membranes, sugar solutions or similar steps, which has a very high resolving power and gives the separated functions in high concentrations, which may be used also for efficient separation of low-molecular ampholytes by designing the device in a manner preventing any diffusion after the separation has been stopped by disconnection of the voltage source, and which can be designed for continuous operation as for instance for preparative separation of large samples or for analytic separation of different samples sequentially supplied to the separation device, which is a very important improvement as compared to prior separation devices which can be used only for batch separation.

The device according to the invention is characterized in that it comprises a horizontal, generally box- or trough-shaped receptacle for receiving a solution of an ampholyte mixture to be separated, said receptacle having a bottom, end walls and sidewalls with electrically nonconducting inner surfaces, two electric electrodes disposed in said receptacle close to the opposite end walls thereof and adapted to be connected to a direct voltage source at operation of the device, said bottom being provided with a plurality of impermeable and electrically nonconducting transverse walls projecting upwards from said bottom and extending perpendicularly to said sidewalls, so as to divide the space in the receptacle closest to said bottom into a plurality of compartments disposed one after the other from the one end wall to the opposite end wall, at least one cooled surface being provided in each of said compartments.

In a device according to the invention the system is stabilized against thermal convection in that in each compartment in the receptacle there is automatically established a density gradient with the largest density lowermost in the compartment. As will be explained in detail in the following this density gradient is established partly under the influence of the thermal diffusion in the heated solution towards the cooled surface provided in each compartment and partly under the influence of the gravity force which causes an ampholyte fraction concentrated in a given compartment to sink downwards to the lowermost portion of the compartment. The lastmentioned phenomenon also prevents a fraction concentrated to a given compartment from spreading to the adjacent compartments under the influence of the gravity force and the diffusion. Therefore, the device according to the invention may be used also for separation of very large samples. The resolving power of the device may be made very large by increasing the number of compartments.

The cooled surfaces in the different compartments at the bottom of the receptacle may consist of cooling pipes extending through the compartments and having a cooling medium flowing through them or alternatively of the transverse walls separating the compartments in that a cooling jacket for a flow of cooling medium is provided immediately underneath the bottom of the receptacle, so that the bottom is cooled. In the latter case the bottom of the receptacle is preferably uniformly ridged with the ridges extending perpendicularly to the sidewalls of the receptacle, whereby the upwards projecting ridges form the transverse walls and the ditches between the ridges form the compartments. With a bottom designed in this way a very efficient cooling is obtained of the upwards projecting ridges from the cooling jacket disposed underneath the bottom.

In order to force the electric current passing through the solution down into the lowermost portions of the compartments so that the entire ampholyte mass will take part in the isoelectric separation, the device according to the invention is preferably provided with a plurality of second impermeable transverse walls equal in number to the number of compartments, which second transverse walls extend perpendicularly to the sidewalls of the receptacle and from above project downwards into each of said compartments with their lower edges spaced somewhat from the receptacle bottom in each compartment. These additional transverse walls projecting downwards into the compartments may be provided on the lower surface of a cover or lid on the receptacle. If the bottom of the receptacle is ridged in the manner described in the foregoing, also the lower surface of such a cover or lid may be ridged in a similar way, whereby the downwards projecting ridges in the lower surface of the cover form transverse walls projecting downwards into the compartments at the bottom of the receptacle. In this case also said cover may be designed as a cooling jacket so that also the transverse walls projecting downwards into the compartments form cooled surfaces.

A device according to the invention can be designed for batch or continuous operation. In the latter case one sidewall of the receptacle is provided with a number of inlet openings for the continuous supply of a solution of the ampholyte mixture to be separated, whereas the opposite sidewall of the receptacle is provided with a number of outlet openings corresponding to the number of compartments and disposed opposite each compartment for discharging the fractions of the separated ampholyte mixture obtained in the different compartments. In this case the breadth of the receptacle between the two sidewalls and the flow rate of the ampholyte solution through the receptacle are adjusted in such a way that a complete separation of the ampholyte in the solution supplied to the receptacle is present at the sidewall of the receptacle in which the outlet openings are provided.

In the following the operation and the advantages as well as additional characteristic features of devices according to the invention for isoelectric separation will be further described with reference to the accompanying drawing, which shows by way of example a number of different embodiments of the invention. In the drawings.

Figure 1:
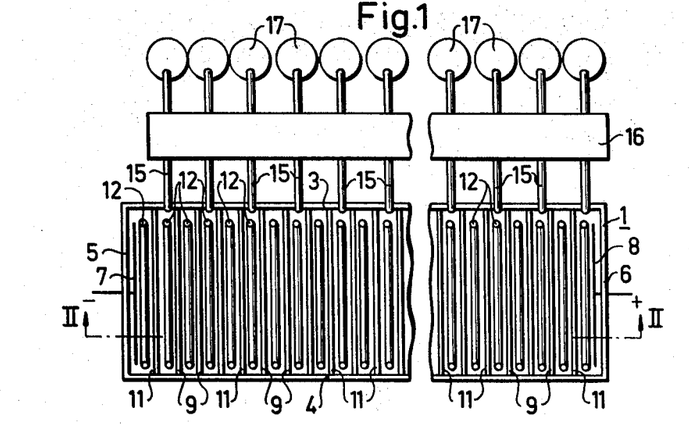
FIG. 1 shows schematically a first embodiment of a separation device according to the invention in top view.
Figure 2:
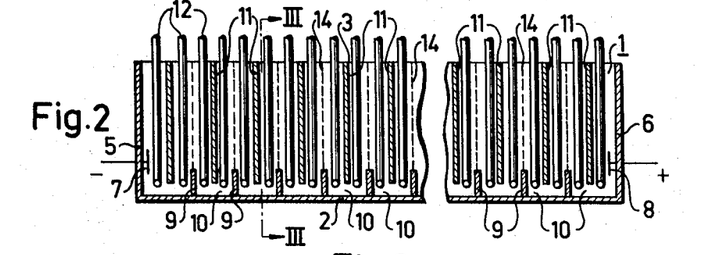
FIG. 2 is a vertical section through the device in FIG. 1 taken along the line II—II in FIG. 1.
Figure 3:
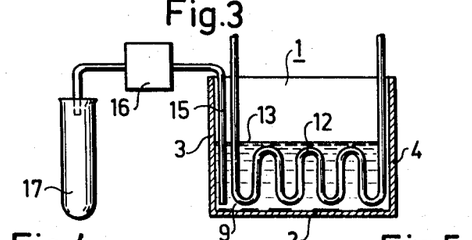
FIG. 3 is a vertical section through the same device taken along the line III—III in FIG. 2.

The isoelectric separation device according to the invention illustrated in FIGS. 1, 2 and 3 comprises a rectangular, generally box- or trough-shaped receptacle, generally designated with 1, having a bottom 2, two sidewalls 3, 4 and two end walls 5, 6. The receptacle consists of an electrically nonconducting material or has at least electrically nonconducting inner surfaces. In the receptacle two electrodes 7 and 8 are located close to the end walls 5 and 6 respectively. In operation of the separation device these two electrodes are connected to the poles of a direct voltage source not illustrated in the drawing. The bottom 2 of the receptacle is provided with a number of upwards projecting vertical transverse walls 9, which extend perpendicularly to the sidewalls 3 and 4 and which are impermeable and consist of an nonconducting material or at least have electrically nonconducting surfaces. These transverse walls 9 divide the space within the receptacle closest to the bottom 2 into a corresponding number of compartments 10 positioned one after the other from the one electrode 7 to the other electrode 8. In each of these compartments 10 an additional, vertical transverse wall 1 projects downwards with its lower edge spaced somewhat from the bottom 2 of the receptacle. Also these additional transverse walls 11 extend perpendicularly to the sidewalls 3 and 4 and they may be attached to or supported from these sidewalls 3 and 4. In each compartment 10 there is provided a cooling pipe 12, through which a cooling medium as for instance cooled water flows at the operation of the device. The height of the transverse walls 9 separating the compartment may for instance be 5–10 mm. and the number of compartments in the receptacle may be 50–100.

In operation of this separation device a solution of the ampholyte mixture to be separated is filled into the receptacle 1 so that the liquid surface 13 assumes substantially the position indicated in FIGS. 2 and 3. As mentioned in the foregoing, the ampholyte solution comprises preferably a known mixture of low-molecular carrier ampholytes, which establish a desired pH gradient in the separation cell, and a sample of more high-molecular ampholytes to be separated. When the receptacle has been filled with the ampholyte solution, the electric circuit from the voltage source to the two electrodes 7 and 8 is closed. This produces an electric field in the solution between the two electrodes 7 and 8 and by electrophoretic migration in this electric field the ampholyte in the solution range themselves between the electrodes 7 and 8 in the manner described in the foregoing so that the ampholyte having the lowermost isoelectric point, that is the most acid ampholyte, is collected closest to the anode 8 and the ampholyte having the highermost isoelectric point, that is the most basic ampholyte, is collected at that cathode 7, whereas the other ampholytes are arranged therebetween in a sequence determined by their isoelectric points.

The low-molecular carrier ampholytes have a strong buffer activity and establish therefore a stable pH gradient between the electrodes 7 and 8 with the lowermost pH value closest to the anode 8. In this pH gradient the different high-molecular ampholytes in the solution are concentrated at the points where the pH values correspond to the isoelectric points of the high-molecular ampholytes. As the rate of diffusion of the high-molecular ampholytes is much lower than the rate of diffusion of the low-molecular carrier ampholytes, the high-molecular ampholytes are concentrated or focused very strongly at their isoelectric pH.

As mentioned in the foregoing this isoelectric separation may be seriously disturbed by thermal convection in the solution, which is caused by the heating of the solution by the electric current flowing therethrough. In the separation device according to the invention the solution is stabilized against this thermal convection in that in each compartment 10 a thermal diffusion in the solution is established towards the cooled surface formed by the cooling pipe 12 in the compartment. It is well known that if a hot solution is in contact with a cold surface, the substances solved in the solution will by thermal diffusion collect at the cold surface. Therefore, in the separation device according to the invention the ampholytes present in a given compartment will by thermal diffusion collect at the cooled surfaces formed by the cooling pipe 12. Consequently the solution becomes more concentrated close to these cooling pipes and will due to its higher density sink towards the bottom of the compartments, whereby a density gradient is established in each compartment with the higher density lowermost in the compartment. If the difference in temperature between the solution and the cooled surface is large and the distance of travel for the solved substances in the solution to the cooled surface is short, this process will be comparatively rapid. This thermal diffusion and the density gradient in each compartment established thereby counteracts effectively a thermal convection between the different compartments. At the same time, of course, also the electrophoretic migration of the ampholytes to their correct positions in the separation receptacle is counteracted to a certain extent. However, an ampholyte located far away from its final position in the separation cell is affected by a large electrophoretic force, wherefore in spite of the thermal diffusion and the density gradient established thereby in each separate compartment the ampholyte will migrate towards its final position in the separation cell. An ampholyte which has reached its correct compartment in the separation receptacle is, however, efficiently prevented by the thermal diffusion and the density gradient established thereby from being removed from this compartment by the thermal convection. It is to be noted that the thermal diffusion is at its largest at the beginning of the separation when the average distance of the different ampholytes to their final positions in the separation cell is large. In this state the conductivity of the solution and thus the electric current flowing through the solution is large, wherefore the solution is heated to a higher temperature. The more the different ampholytes in the solution approach their final positions, that is their isoelectric pH, the more the conductivity of the solution and thus the electric current and also the temperature of the solution decreases.

However, there is an additional mechanism which creates a desired stabilizing density gradient in each compartment 10. An ampholyte fraction and in particular a high-molecular ampholyte fraction concentrated to a given compartment has a tendency to sink under the influence of the gravity force towards the bottom of the receptacle, whereby the ampholyte fraction in itself creates a density gradient in the compartment. This density gradient will obviously become more pronounced the more the ampholyte fraction is concentrated to the compartment and is consequently at its strongest at the end of the separation. This density gradient prevents efficiently the ampholyte fraction concentrated to the compartment from spreading under the influence of the thermal convection to the adjacent compartments and remixing with other ampholyte fractions concentrated to these compartments. It is also appreciated that a large and heavy fraction concentrated or focused to a given compartment can not under the influence of the gravity force "fall out" into the adjacent compartments but that it will, on the contrary, under the influence of the gravity sink downwards in its associated compartment. For this reason the separation device according to the invention can be used successfully for the separation of very large samples. The density gradient established in the different compartments by the concentrated fractions themselves counteracts also very strongly the dispersion of the fraction under the influence of the thermal convection after the end of the separation when the current to the electrodes 7 and 8 is interrupted.

The object of the transverse walls 11 projecting from above downwards into the compartments 10 is primarily to force the electric current down towards the bottom in each compartment so that it is ensured that the entire ampholyte mass in the solution will take part in the isoelectric separation.

The separation device according to the invention illustrated in FIGS. 1 to 3 is primarily intended for the separation and concentration of ampholytes in comparatively large liquid volumes, wherefore the liquid surface 13 will be positioned relatively high above the transverse walls 9. For this reason it may be preferable to separate the different compartments 10 from one another additionally by prolonging the transverse walls 9 in direction upwards with fine mesh screens or semipermeable membranes 14. As known in the art these semipermeable transverse walls will contribute to preventing thermal convection and diffusion between the different compartments 10. However, as mentioned in the foregoing they will also cause a certain electro-osmosis and are therefore from this point of view less advantageous. If the separation device is used for smaller volumes of solution so that the liquid surface 13 is positioned only slightly above the upper edges of the impermeable transverse walls 9, the semipermeable transverse walls 14 can be omitted without any drawback.

When the separation is completed, the compartments 10 must be emptied simultaneously and as fast as possible in order to prevent a remixing of the separated ampholyte fractions concentrated to the different compartments. In the embodiment of the invention illustrated in FIGS. 1 to 3 this is carried out by means of a pipe 15 inserted in each compartment 10 and ending close to the bottom in the compartment. The opposite ends of these pipes 15 are connected to a pump unit 16 including a pump for each pipe 15. Preferably these pumps consist of manually operated or motor-driven peristaltic pumps. By means of the pumps in the pump unit 16 the solution volumes present in the different compartments 10 are pumped to a corresponding number of test tubes or similar vessels 17, in which consequently the different fractions of the ampholyte mixture are collected. Each test tube will consequently receive an ampholyte fraction consisting of at least one low-molecular carrier ampholyte and in addition thereto possibly also a more high-molecular ampholyte from the separated sample. The proportions or quantities of the different high-molecular ampholyte fractions in the sample can easily be determined by analyzing the solutions in the different test tubes 17. If for instance the sample consists of a protein mixture, this can be done by photometric ultraviolet absorption analysis of the solutions in the different test tubes 17. Further it is easy to determine the pI of each fraction in the separated sample by determining the pH of the solution in the test tube 17 in which the sample fraction concerned is collected, as each fraction in the sample will, as explained in the foregoing, be concentrated to the point in the separation receptacle where the pH value in the pH gradient established by the carrier ampholyte mixture corresponds to the pI of the fraction concerned. The high-molecular ampholyte fractions may be readily separated from the low-molecular carrier ampholytes by dialyzing or gelfiltering, if additional analyses or tests with the high-molecular ampholyte fractions are to be carried out. No other contaminations of the separate ampholytes, as for instance from a sugar solution, are present.

Figure 4:
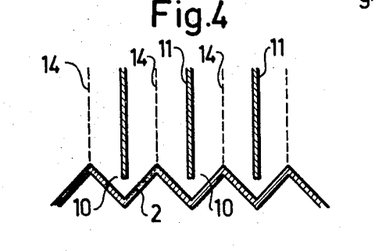
FIGS. 4 and 5 show schematically two modified designs of the bottom of the receptacle and of the transverse walls projecting upwards from the bottom and separating the different compartments in the receptacle.

FIG. 4 illustrates schematically and in a vertical section similar to the section in FIG. 2 another usable design of the bottom 2 of the receptacle. In this case the bottom 2 is ridged with the ridges extending perpendicularly to the sidewalls of the receptacle, whereby the ditches between the ridges form the compartments 10 and the upwards projecting ridges separate these compartments 10 and form impermeable transverse walls corresponding to the transverse walls 9 in the embodiment of the invention illustrated in FIGS. 1 to 3. In such a ridged bottom 2 the inclined sides of the ridges may form the cooled surfaces in the compartments 10 in that a cooling jacket for a flow of a cooling medium is provided immediately beneath the bottom 2. In this case the cooling pipes 2 in the receptacle may be omitted, whereby the separation device is considerably simplified.

Figure 5:
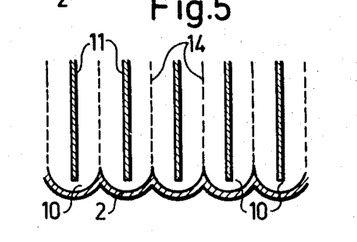

FIG. 5 illustrates in a manner similar to FIG. 4 still another usable "ridged" design of the receptacle bottom 2, which will operate in the same way as the embodiment illustrated in FIG. 4.

A receptacle bottom design as illustrated in FIG. 4 and FIG. 5 has the advantage relative to the design according to FIGS. 1-3 that it is easier to force the electric current to flow through the entire ampholyte mass so that all ampholytes will take part in the isoelectric separation. With a design according to FIGS. 1-3 there is a certain risk that ampholytes will collect in the corners between the bottom 2 of the receptacle and the transverse walls 9 and in this way removed from the isoelectric separation.

Figure 6:
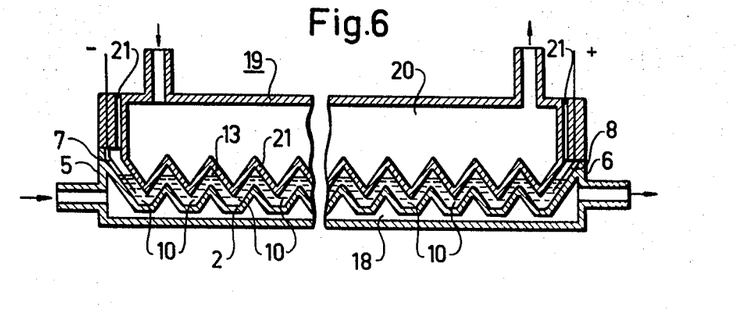
FIG. 6 shows in vertical section parallel to the sidewalls of the receptacle a second embodiment of a separation device according to the invention.

FIG. 6 illustrates in a vertical section parallel to the sidewalls of the receptacle a second embodiment of the invention, in which the bottom 2 of the receptacle is ridged in the manner described in the foregoing and provided with a subjacent cooling jacket 18, through which a cooling agent, as for instance cold water, can flow at the operation of the device. The receptacle is also provided with a lid generally designated by 19, which is provided with a cooling jacket 20, through which also a cooling medium may flow at the operation of the device. The underneath surface 21 of the lid 19 is ridged in the same way as the bottom 2 of the receptacle so that the downwards projecting ridges in the underneath surface 21 of the lid form impermeable transverse walls projecting downwards into the compartments 10 in a manner similar to the transverse walls 11 in the embodiment illustrated in FIGS. 1-3. In the embodiment of the invention illustrated in FIG. 6, consequently, the inclined side surfaces of the ridges in the receptacle bottom 2 as well as the inclined side surfaces of the ridges in the underneath surface 21 of the lid form cooled surfaces, which cause a thermal diffusion and thus establish a stabilizing density gradient in each compartment 10. The lid 19 is removable. The ridges in the bottom 2 of the receptacle and in the lower surface 21 of the lid and the spacing between the bottom 2 and the lower surface 21 of the lid, when the lid is in its operating position, are given such dimensions that if the compartments 10 in the bottom 2 of the receptacle are filled completely with a solution when the lid is removed and subsequently the lid is put on the receptacle in its operating position, the liquid surface 13 will rise up into the ditches in the underneath surface 21 of the lid and consequently above the upper edges of the upwards projecting ridges in the bottom 2 of the receptacle. A separation device of this type may for instance be dimensioned to comprise 100-200 compartments with a breadth of each ridge of about 5-10 mm. and a height for the liquid surface 13 above the bottom of the compartments 10 of about 5-10 mm. at the operation of the device. The thickness of the liquid layer between the ridged bottom 2 and the ridged underneath surface 21 of the lid 19 may be about 0.5-3 mm. and is consequently somewhat exaggerated in the drawing for the sake of clarity.

The isoelectric separation of the ampholytes in the ampholyte solution filled into this device takes place in the same way as described in the foregoing with reference to FIGS. 1-3, the solution being stabilized against thermal convection by the density gradient established in each separate compartment partly by the thermal diffusion and partly by the concentrated ampholyte fractions themselves. When the separation is completed the current to the electrodes 7 and 8 is interrupted and at the same time the lid 19 is raised. As appreciated from the foregoing the liquid surface 13 will then sink to or below the upper edges of the upwards projecting ridges in the bottom 2 of the receptacle. In this way any flow or remixing between the different compartments 10 caused by diffusion or thermal convection is prevented and one can consequently without any undue haste remove the different ampholyte fractions from the different compartments 10, one fraction at the time, in any arbitrary order for determining their quantities and pI in the manner described in the foregoing. As consequently no diffusion can take place after the interruption of the separation, this separating device according to the invention can preferably be used for separating low-molecular ampholytes, as for instance for production of carrier ampholyte mixtures having predetermined pH ranges.

Before the separation when the compartments 10 in the ridged bottom are being filled with the unseparated ampholyte solution, the compartment 10 closest to the cathode may preferably be filled with a weak base and the compartment 10 closest to the anode 8 with a weak acid instead of the ampholyte solution. In this way the ampholytes are prevented under the separation from contacting the electrodes, which can have a deteriorating effect upon certain types of ampholytes. Further, the lid or cover 19 is provided with venting openings 21 adjacent the two electrodes 7 and 8 for the escape of gases produced at the electrodes during the separation process.

Figure 7:
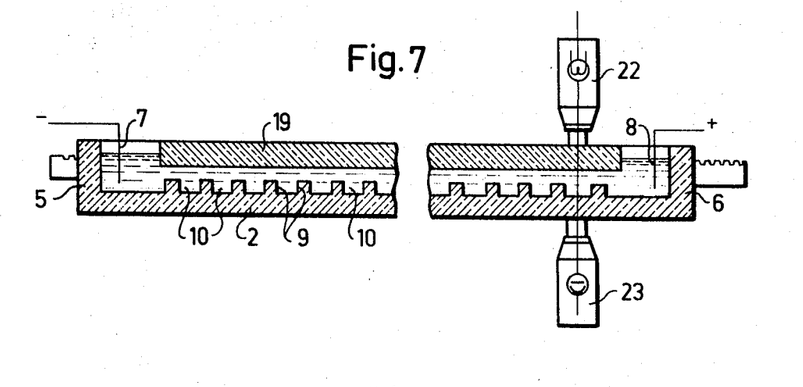
FIG. 7 is a similar vertical section through another embodiment of the invention.
Figure 8:
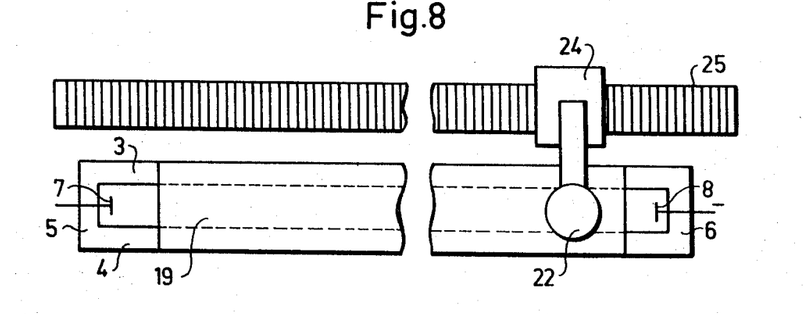
FIG. 8 is a top view of the separation device in FIG. 7.

FIGS. 7 and 8 illustrate still another separation device according to the invention which has a very high resolving power and primarily is intended for rapid analytic separation of small protein samples. As in the foregoing the bottom 2 of the separation receptacle is provided with vertically projecting transverse walls or ridges 9 dividing the space in the receptacle closest to the bottom 2 into a plurality of compartments 10. The bottom 2 of the receptacle is cooled by means of a cooling jacket disposed immediately underneath the bottom 2. For the sake of simplicity this cooling jacket is not shown in FIG. 7. In this embodiment of the invention this cooling jacket is preferably designed so as to be removable from the bottom 2 of the receptacle after completed separation. Also in this case the receptacle is provided with a cover 19 having, however, a plane underneath surface so that the space between the bottom 2 of the receptacle and the cover 19 is completely filled with the ampholyte solution to be separated. The cover 19 does not have to be removable but may be permanently attached to the receptacle. The distance between the underneath surface of the cover 19 and the receptacle bottom 2 is of the order 1 mm. in this embodiment of the invention, whereas the transverse walls or ridges 9 have a height of about 0.5 mm. and a mutual spacing of about 1 mm. Due to these very small dimensions no downwards projecting transverse walls are necessary in the compartments 10 for forcing the electric current towards the bottom of the receptacle in these compartments. The number of compartments may be very large, for instance 200, so that a correspondingly high resolving power can be obtained at the separation. The breath of the separation device perpendicularly to the sidewalls 3 and 4 of the receptacle may be of the order 0.5–1.5 cm. wherefore the device can be used for separation of very small sample volumes.

The bottom 2 as well as the cover 19 of the receptacle are made of a material, as for instance quartz glass, which is translucent for ultraviolet light. Further, the separation device is provided with means for automatic measuring of ultraviolet absorption consisting of an ultraviolet light source 2 located above he cover 19 so as to emit a beam of ultraviolet light towards the cover 19 and a photocell 23 located underneath the bottom opposite to the light source 22. The light source 22 and the photocell 23 are mounted on a carriage or a similar device 24, which is movable on a track 25 along the separation cell parallel to the sidewalls 3 and 4 thereof. In the illustrated embodiment the track 25 consists of toothed rack with which a motor-driven toothed wheel in the carriage 24 may be in engagement. After completed separation the photometer unit 22, 23, 24 can be moved on the rack 25 along the separation cell while the output signals from the photocell 23 is recorded, by a recorder, not shown in the drawing, as a function of the distance travelled by the photometer unit. The recorder connected to the photocell 23 will then produce diagram illustrating the quantities and the positions of the different fractions in the separated protein sample.

It is appreciated that this separation and analysis can be carried out very rapidly as the separation, due to the small dimensions of the separation device, takes place rapidly and as the analyzing of the different fractions can be carried out very rapidly without the different fractions having to be removed from the separation cell. It should also be noted that it is not necessary to interrupt the current to the electrodes 7 and 8 before the photometer measuring, wherefor there is no risk that the different ampholyte fractions focused at different points in the separation cell are spread and remixed due to diffusion before the photometric measuring. Certainly this embodiment of the invention does not make it possible at the same time to determine the pI for the different separated protein fractions. However, if a known carrier ampholyte mixture is used and the pH gradient established by this carrier ampholyte mixture in the separation cell has been previously determined accurately, it is possible to determine the pI of the different protein fractions fairly accurately from their positions in the separation cell.

Figure 9:
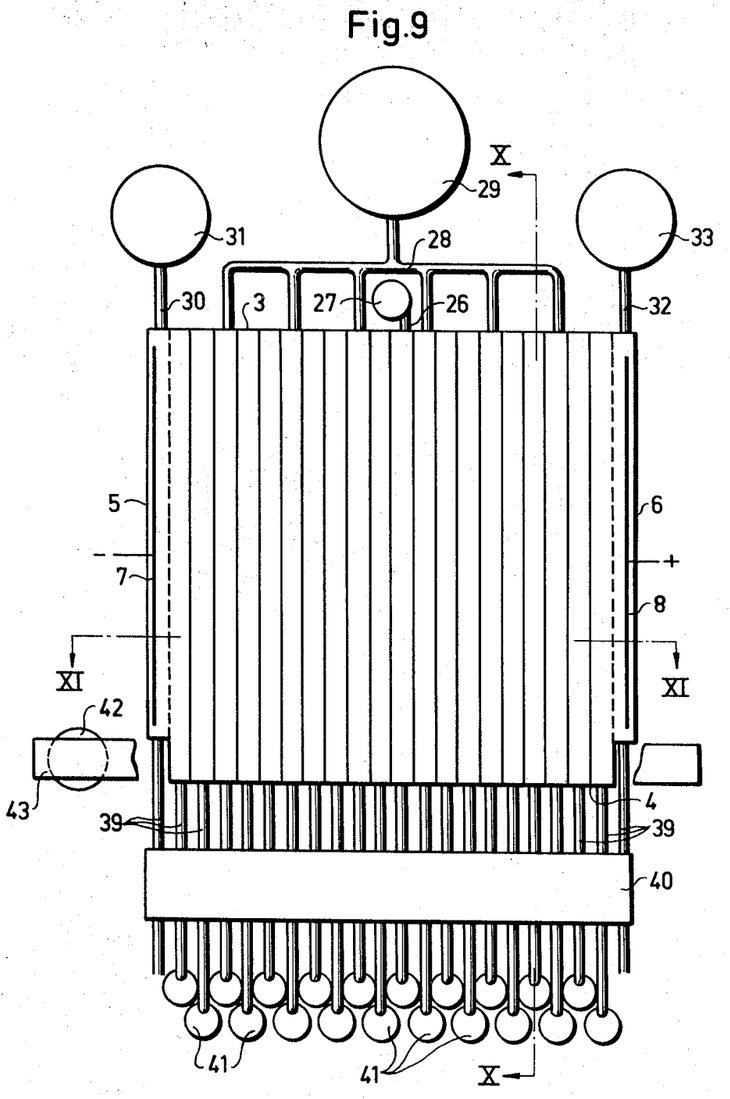
FIG. 9 is a top view of a separation device according to the invention designed for continuous operation.
Figure 10:
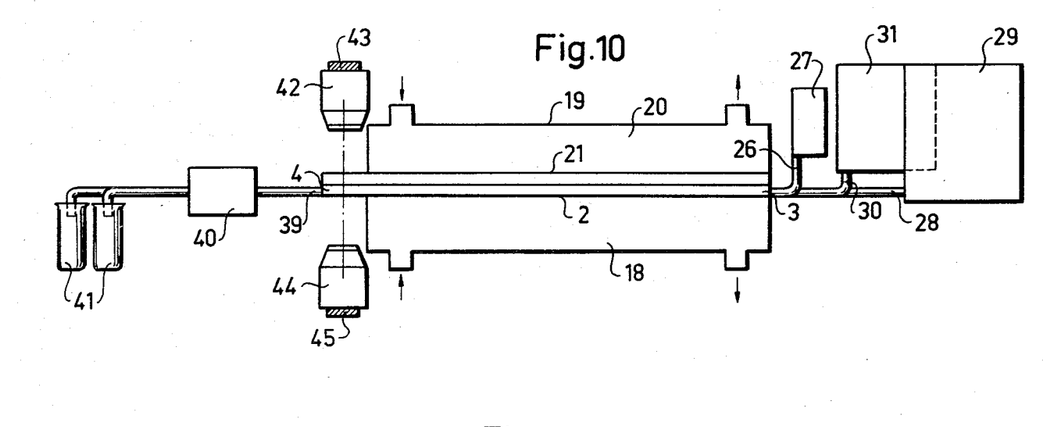
FIG. 10 is a vertical section along the line X—X through the separation device shown in FIG. 9.
Figure 11:
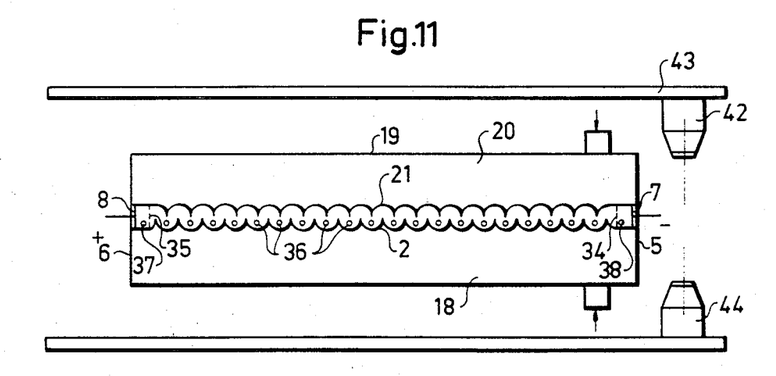
FIG. 11 is a vertical section through the same device along the line XI—XI in FIG. 9.

All the separation devices according to the invention described in the foregoing can only be used for batch operation. However, it is also possible to design a separation device according to the invention for continuous operation. FIGS. 9, 10 and 11 illustrate such a device schematically. FIG. 9 is top view of the device with the cover of the separation cell removed for the sake of clarity, whereas FIGS. 9 and 10 are vertical sections through the device along the lines X—X and XI—XI respectively in FIG. 9. The separation cell as such is in principle designed in the same way as the device illustrated in FIG. 6, that is the bottom 20 of the separation receptacle is uniformly ridged and provided with a subjacent cooling jacket 18 and the cover 19 has a correspondingly ridged underneath surface 21 and is provided with a cooling jacket 20. In the illustrated embodiment the ridges in the bottom 2 of the separation receptacle and in the underneath surface 21 of the cover are shaped substantially as illustrated in FIG. 5 but could of course also have the shape illustrated in FIG. 6. It would also be possible to use a bottom 2 in the separation cell designed as illustrated in FIG. 7 and a cover having a plane underneath surface. In this embodiment of the invention the cover 19 does not have to be removed or raised during the continuous operation of the device and the entire space between the bottom 2 of the separation cell and the underneath surface 21 of the cover is filled with a solution, as will be described in detail in the following. Thus, the cover 19 may be permanently attached to the separation cell. As most readily seen in FIG. 10 the lower cooling jacket 18 and the cooling jacket 20 in the cover are terminated at some distance from the one sidewall 4 of the separation cell. The portions of the separation cell projecting outside he cooling jackets 18 and 20 are made of a material translucent to ultraviolet light. It should be noted that in the drawing for the sake of simplicity a much smaller number of ridges and thus compartments in the separation cell are illustrated than the actual number. The device may for instance be provided with 100–200 different compartments and have a largest distance between the bottom 2 of the cell and the underneath surface 21 of the cover of about 2 mm.

For the continuous supply of the ampholyte solution to the separation cell the one sidewall 3 of the cell is provided with a number of inlet openings for the ampholyte solution. One of these inlet openings is through a pipe 26 connected to a container 27 intended for the sample to be separated, whereas the remaining inlet openings are through pipes 28 connected to a container 29 for the carrier ampholyte solution to be used. Adjacent the end wall 5 the sidewall 3 is provided with an additional inlet opening, which is connected through a pipe 30 to a container 31 for a base, as for instance 1% NaOH. At its opposite end, adjacent the end wall 6, the sidewall 3 is in the same way provided with an inlet opening, which is connected through a pipe 32 to a container 33 for an acid, as for instance 1 % $H_3PO_4$. As FIGS. 9 and 11 show, the portion of the separation cell closest to the cathode 7 is separated from the remaining portion of the separation cell by a transverse wall 34 consisting of a semipermeable membrane. In the same way the portion of the separation cell containing the anode 8 is separated from the major portion of the cell by a semipermeable membrane 35. The object of these semipermeable transverse walls 34 and 35 is to prevent the gas produced at the electrodes 7 and 8 from getting in contact with the ampholytes in the separation cell. The ampholytes are prevented from getting in direct contact with the electrodes 7 and 8 by the base supplied to the cathode space from he container 31 through the pipe 30 and the acid supplied to the anode space from the container 33 through the pipe 32. The opposite sidewall 4 of the separation cell is provided with a number of outlet openings 36 (shown in FIG. 11) equal in number to the number of compartments in the cell and located opposite the compartments. There is also provided similar outlet openings 37 and 38 respectively from the anode space and the cathode space respectively. These outlet openings are through associated pipes 39 connected to a pump unit 40 including a separate pump for each pipe 39. Preferably the pump unit 40 consists of motor-driven peristaltic multichannel pumps. By means of these pumps the portions of the ampholyte solution present at the sidewall 4 of the cell in the different compartments of the cell are transferred to corresponding test tubes or fraction collectors 41. The base and the acid respectively from the cathode space and the anode space respectively are pumped by the associated pumps in the pump unit 40 to discharge vessels not shown in the drawing.

The pumps in the pump unit 40 are driven continuously so that a continuous flow of ampholyte solution is maintained through the separation cell from its one sidewall 3 to its opposite sidewall 4, that is in a direction perpendicular to the electric current path between the electrodes 7 and 8. Consequently, the separation of the ampholyte solution supplied to the cell at the sidewall 3 takes place while the solution is flowing towards the opposite sidewall 4 of the cell. The pumping rate and the breadth of the separation cell between the two sidewalls 3 and 4 are adjusted so that the dwell time of the solution in the separation cell is at least equal to the time required for a complete separation of the ampholyte constituents in the solution. Consequently, in the different test tubes 41 the different fractions in the unknown ampholyte mixture supplied to the device are obtained and in addition thereto also in the usual way the different portions of the carrier ampholyte mixture being used. As long as the same carrier ampholyte is used, the pH values in the different test tubes 41 will remain constant, wherefore they may be determined only once and subsequently checked at long intervals. The quantities and the positions of the different fractions in the separated sample may be determined in a similar manner as in the device illustrated in FIG. 7 by means of an ultraviolet absorption photometer consisting of an ultraviolet light source 42 movable on a track 43 above the ultraviolet translucent portion of the separation cell closest to the exit side 4 and a photocell 44, which is positioned opposite to the light source 42 and is moved in synchronism with the light source 42 along a track 45 extending underneath the separation cell.

The continuously operation separation device according to the invention described above can be used either for preparative separation of large samples or for analytic separation of a large number of different samples supplied to the device one after the other. At a preparative separation of large amounts of a certain ampholyte mixture one does not generally need a too large resolving power, wherefore the separation cell can be provided with a smaller number of compartments and be designed for a large flow so that large amounts of material can be treated during a given time. Neither is the ultraviolet absorption photometer device really necessary, as one can without any substantial inconvenience determine the quantities and the isoelectric points of the different fractions in the sample by analyzing the fractions collected in the test tubes 41 in the usual way. Also the special container 27 for the sample may be omitted, as without convenience the sample may be mixed into the carrier ampholytes in the container 29 and be supplied to the separation cell together with the carrier ampholytes.

When using a device for analytic separation of a plurality of different samples, however, the ultraviolet absorption photometer described and the special container 27 for the samples are required. The operation of the device is then that the carrier ampholyte solution from the container 29 is continuously supplied to the separation cell whereas the different ampholyte samples, as for instance protein samples, which are to be analyzed are supplied to the container 27 at predetermined time intervals so that they are supplied to the separation cell in a predetermined sequence at predetermined time intervals. The photometer device 42, 44 is operated in synchronism with the supplying of new samples to the container 27 so that each sample is scanned by the photometer device when it reaches the exit side 4 of the separation cell in a separated state. At any given moment the separation cell will consequently contain several samples, which are arranged one after the other in the flow direction through the cell and which are in different states of separation. As the pI values in the different test tubes 41 and thus also in the different exit pipes 39 remain constant as long as one and the same carrier ampholyte solution is used and consequently need to be checked only at very long time intervals and as the supplying of samples may without any particular difficulties be automized and synchronized with the operation of the photometer device and the pump unit 40, which determines the flow rate, a device is obviously obtained by means of which a large number of different samples can be separated and analyzed fully automatically.

I claim:

1. A device for isoelectric separation of ampholyte mixtures, comprising a substantially rectangular, horizontal, generally box- or through-shaped receptacle (1) for receiving a solution of an ampholyte mixture to be separated, said receptacle having a bottom (2), two opposite end walls (5,6) and two opposite sidewalls (3,4) with electrically nonconducting inner surfaces two electrodes (7,8) inserted in said receptacle adjacent said opposite end walls and adapted to be connected to a direct voltage source at operation of the device, said bottom being provided with a plurality of impermeable transverse walls (9) projecting upwards from said bottom and extending perpendicularly to said side walls so as to divide the space within the receptacle adjacent said bottom into a plurality of compartments, and cooling means in contact with at least one of said transverse walls in each of said compartments.

2. A device as claimed in claim 1, wherein said cooling means in said compartments (10) comprises of pipes (12) for a flow of cooling medium extending through said compartments.

3. A device as claimed in claim 1, wherein said cooling means in said compartments (10) comprises a cooling jacket (18) for a flow of cooling medium immediately underneath said bottom.

4. A device as claimed in claim 1, comprising for each of said compartments (10) a second impermeable transverse wall (11) extending perpendicularly to said side walls (3,4) and projecting from above downwards into said associated compartment with its lowermost edge spaced from said bottom (2).

5. A device as claimed in claim 1, wherein said first, impermeable transverse walls (9) projecting upwards from said bottom (2) are extended upwards with permeable membranes (14).

6. A device as claimed in claim 1, wherein said bottom (2) of said receptacle is uniformly ridged with ridges and intermediate ditches extending perpendicularly to said sidewalls (3,4), said ridges forming said first impermeable transverse walls projecting upwards from said bottom and said intermediate ditches forming said compartments (10).

7. A device as claimed in claim 4, comprising a cover (19) for said receptacle, said cover having an electrically nonconducting lower surface.

8. A device as claimed in claim 7, wherein said second transverse walls (11) projecting downwards into said compartments (10) are attached to the lower surface of said cover 19.

9. A device as claimed in claim 8, wherein said lower surface (21) of said cover (19) and said receptacle bottom are provided with similar ridges and ditches extending perpendicularly to said sidewalls, said downwards pointing ridges on said lower surface of said cover forming said second impermeable transverse walls projecting downwards into said compartments (10).

10. A device as claimed in claim 7, wherein said cover (19) is provided with a cooling jacket (20) for a flow of cooling medium.

11. A device as claimed in claim 7, wherein said cover (19) is removable from said receptacle.

12. A device as claimed in claim 1, comprising two semipermeable transverse walls (34,35) extending perpendicularly to said sidewalls (3,4) in said receptacle adjacent said end walls (5,6) so as to separate the spaces within the receptacle containing said two electrodes (7,8) from the remaining major space within the receptacle.

13. A device as claimed in claim 7, wherein said bottom (2) and said cover (19) consist of a material translucent to ultraviolet light, comprising absorption measuring means including an ultraviolet radiation source (22 or 42) disposed on the one side of said receptacle for emitting a vertical beam of ultraviolet light towards said receptacle and a photocell (23 or 44) disposed opposite to said light source on the opposite side of the receptacle, said light source and said photocell being movable relative to the receptacle parallel to said sidewalls (3,4).

14. A device as claimed in claim 1, comprising a number of pipes (15) inserted in separate ones of said compartments (10) adjacent said bottom (2) and pump means (16) connected to said pipes.

15. A device as claimed in claim 1, wherein one of said sidewalls (3) is provided with a number of inlet openings for the supply of a solution of an ampholyte mixture to be separated and the opposite sidewall (4) is provided with a number of outlet openings (36) corresponding to said compartments (10) for the discharging of the fractions of a separated ampholyte mixture obtained in said compartments.

16. A device as claimed in claim 15, wherein said outlet openings (36) are through separate pipes (39) connected to pump means (40).

17. A device as claimed in claim 16, wherein at least one of said inlet openings is connected through a pipe (26) to a first container (27) for receiving an unknown ampholyte mixture to be separated, and the remaining inlet openings are connected through pipes (28) to a second container (29) for receiving a solution of a known ampholyte mixture.

* * * * *